(12) United States Patent
Merritt

(10) Patent No.: US 6,393,025 B1
(45) Date of Patent: May 21, 2002

(54) TIME-SENSITIVE PACKET PROCESSOR FOR AN ATM SWITCH

(75) Inventor: Effie Y. W. Merritt, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/370,500

(22) Filed: Aug. 9, 1999

(51) Int. Cl.$^7$ .............................................. H04L 12/56
(52) U.S. Cl. ...................................... 370/395.6; 370/46
(58) Field of Search ................................ 370/389, 395, 370/397, 399, 466, 474

(56) References Cited

U.S. PATENT DOCUMENTS

| | | | | |
|---|---|---|---|---|
| 6,028,863 A | * | 2/2000 | Sasagawa .................... | 370/399 |
| 6,049,530 A | * | 4/2000 | Peterson et al. ............. | 370/248 |
| 6,075,798 A | * | 6/2000 | Lyons et al. ................. | 370/474 |
| 6,108,336 A | * | 8/2000 | Dault et al. .................. | 370/395 |
| 6,128,659 A | * | 10/2000 | Subblah et al. .............. | 709/225 |
| 6,169,738 B1 | * | 1/2001 | Sriram et al. ................ | 370/395 |
| 6,219,339 B1 | * | 4/2001 | Doshi et al. ................. | 370/235 |
| 6,229,821 B1 | * | 5/2001 | Bharucha et al. ........... | 370/471 |
| 6,253,323 B1 | * | 7/2001 | Benayoun et al. .......... | 370/474 |

* cited by examiner

Primary Examiner—Salvatore Cangialosi
Assistant Examiner—Ken Vanderpuye
(74) Attorney, Agent, or Firm—Lieberman & Nowark, LLP

(57) ABSTRACT

An ATM switch is adapted so that it quickly and efficiently converts a time-sensitive packet received from a source of packets via an incoming trunk into one or more ATM cells. The switch, more particularly, indexes a translation table using the identity of the incoming trunk identity to obtain an assigned AAL2 channel within a virtual channel. The switch then converts the received packet to a particular data unit containing at least the assigned AAL2 channel, determines, as a function of the virtual channel index; a virtual path identifier (VPI) and virtual circuit identifier (VCI); and processes the particular data unit to form the payload for an ATM cell. The switch then forms an ATM cell header containing at least the VPI and VCI, appends the header to each such payload and outputs each cell, in turn, to an output carrying the identified channel.

6 Claims, 4 Drawing Sheets

| | |
|---|---|
| TID → $CID_{aa}$ | $VCI_{xx}$ |
| $CID_{ee}$ | $VCI_{yy}$ |
| ⋮ | ⋮ |
| $CID_{nn}$ | $VCI_{pp}$ |

US 6,393,025 B1

TIME-SENSITIVE PACKET PROCESSOR FOR AN ATM SWITCH

FIELD OF THE INVENTION

The invention relates to converting a time-sensitive packet into one or more Asynchronous Transport Mode (ATM) data cells for transport over an ATM network.

BACKGROUND OF THE INVENTION

The Telecommunication Standardization Section (Study Group 13) of the well-known International Telecommunication Union has proposed a standard for processing time-sensitive packets, such as voice packets, for transport over an ATM network. This standard is known as ITU-T Recommendation 1.363.2, and specifies a BISDN ATM Adaptation Layer Type 2 (AAL2) protocol for bandwidth-efficient transmission of low-rate, short and variable length packets in delay sensitive applications. To implement the protocol, an ATM switch that receives a time-sensitive packet will most likely (a) divide the packet into one or more segments to form the payloads of respective ATM cells, (b) append an ATM cell header to each such cell and (c) output the cells in sequence to an associated ATM network for delivery to a destination ATM switch. The destination ATM switch would re-assemble the time-sensitive packet from the data cells that it receives, and forwards the assembled packet to the intended destination.

SUMMARY OF THE INVENTION

I have recognized that, to meet the requirement of transporting a low-rate, short, variable length time-sensitive packet over an ATM network, the reformatting of the packet into ATM cells must be done very quickly and efficiently.

Specifically, when a time-sensitive packet is received by an ATM switch from a source of packets via an incoming trunk, the switch indexes a translation table using the trunk identity to obtain an assigned AAL2 channel and a virtual channel. The switch then converts the received packet to a particular data unit containing at least the assigned AAL2 channel within a virtual channel, and then determines, as a function of the virtual channel index, a virtual path identifier (VPI) and virtual circuit identifier (VCI). The switch then processes, e.g., combines, splits or segments, the particular data unit to form the payload for one or more ATM cells. The switch then forms an ATM cell header containing at least the VPI and VCI, appends the header to each such payload and outputs each cell, in turn, to an output carrying the identified channel.

DETAILED DESCRIPTION

In general, a message is transported in an ATM network from a source to a receiver via a virtual circuit. The virtual circuit is activated whenever the source sends a message to the receiver. The virtual circuit is established using a service that is invoked when the source initially sends a call request via an identified trunk circuit (TID) to an ATM switch, in which the source may be a conventional packet switch arranged to transport time sensitive packets, e.g., voice packets, to an intended receiver. The ATM switch serving the source responds to the request by first consulting a routing table that identifies an output path that may be used to forward a call set-up message to the ATM switch serving the intended receiver, and then transmitting the set-up message over the identified path. The ATM switch associates the output path/channel with the aforementioned trunk ID in a routing table stored in local memory. The routing table is populated by a so-called configuration manager, i.e., a software process. It can be appreciated that the call set-up message may be processed by one or more intermediate ATM switches before the message actually reaches a destination ATM switch. Each ATM switch that receives the call set-up message establishes a virtual connection through its switching fabric to an output path extending to the next switch that forms the next segment of the virtual connection and sends the set-up message thereto. The origination ATM switch thereafter activates the established virtual connection when it receives a packet via the identified trunk circuit, converts the packet to one or more ATM cells containing a virtual path identifier and virtual circuit identifier which uniquely identify a segment of the virtual connection extending to either the destination switch or an intermediate switch and transmits each such cell over the identified route.

Figure 1:
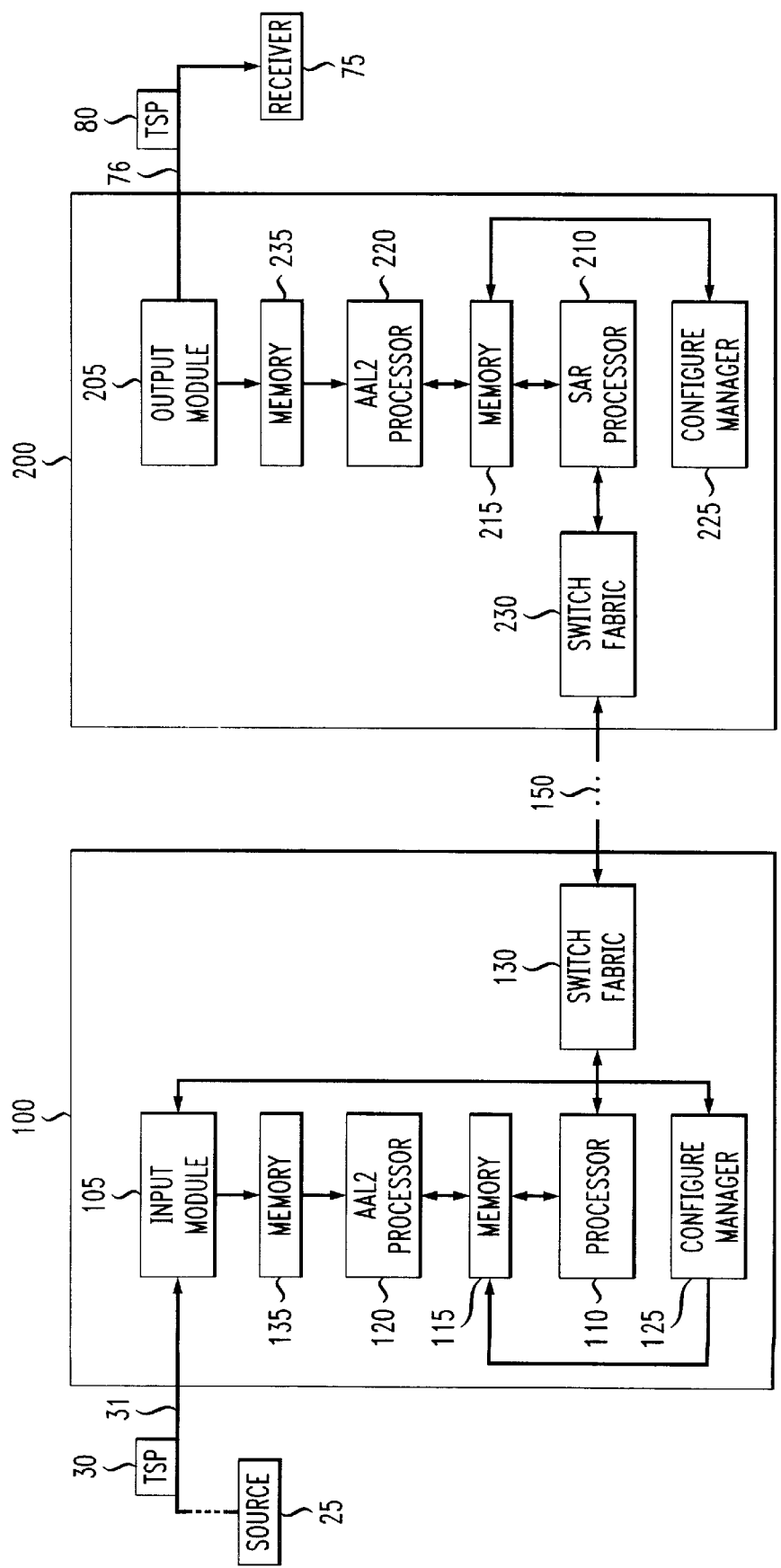
FIG. 1 is a broad block diagram of an Asynchronous Transport Mode (ATM) network in which the principles of the invention may be practiced.
Figure 2:
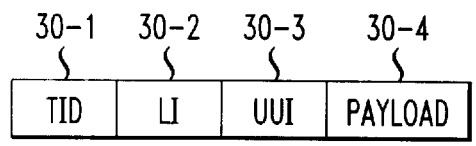
FIG. 2 illustrates the layout of a so-called Service Specific Convergence Sublayer packet.

With the foregoing in mind, FIG. 1 illustrates an ATM network formed from a plurality of ATM switches, two of which are shown in the FIG., namely switches 100 and 200. Each such switch is arranged to provide conventional connection services as well as the processing of time sensitive packets using the proposed ATM Adaptation Layer (AAL) 2. More specifically, assume that source 25 has initiated a call request for the purpose of establishing a call connection between source 25 and receiver 75. In response thereto, ATM switch 100 established a virtual connection between itself and ATM switch 200, in which the connection may traverse one or more intermediate ATM switches (not shown) before reaching ATM switch 200, as mentioned above. Also assume that following the request, source 25 starts sending time-sensitive packets (TSP) to ATM switch 100. One such packet is illustrated in FIG. 1 as packet 30, which is received by a conventional ATM input module 105 that provides a conventional interface between an external source of packets and ATM switch 100. It is assumed that packet 30 comprises a payload and header, in which the payload carries a segment of digitized speech in the form of data bytes, and is formatted as a so-called Service Specific Convergence Sublayer-Protocol Data Unit (SSCS-PDU) specified by the aforementioned AAL2 specification. The layout of an SSCS-PDU is shown in FIG. 2. Briefly, field 30-1 contains the aforementioned trunk ID, TID: field 30-2 specifies the length (LI) of payload field 30-4; field 30-3 is a so-called user-to-user indication (UUI) that is used to transport codepoints between protocol layers (e.g., SSCS to SSCS); and field 304 contains the data/payload that is to be delivered to the intended destination.

Upon receipt of a packet 30 (FIG. 1), module 105 supplies the packet to memory 135, which stores the packet in an input buffer. AAL2 processor scans the input buffer for a newly received SSCS-PDU and quickly converts the PDU into one or more ATM cell payloads. SAR 110 then adds a header to each payload to form an ATM cell for transport via switch fabric 130, all in accordance with the principles of the invention.

Figure 3:
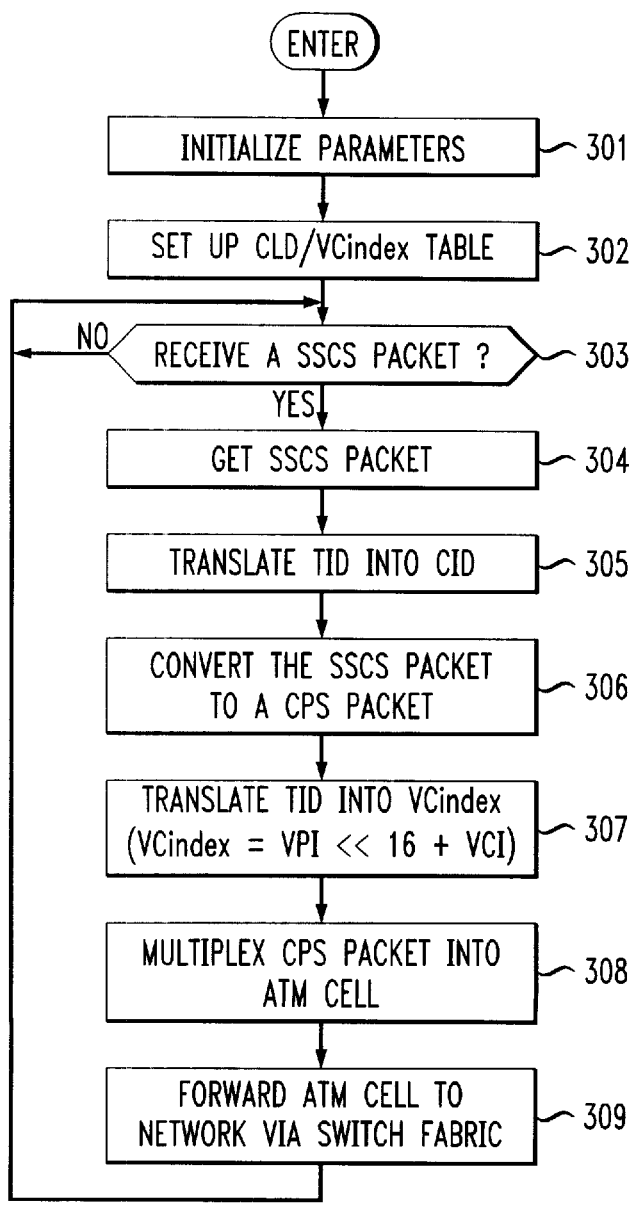
FIG. 3 illustrates in flow chart form the program, which implements the principles of the invention in an originating AAL2 processor.
Figures 4, 5:
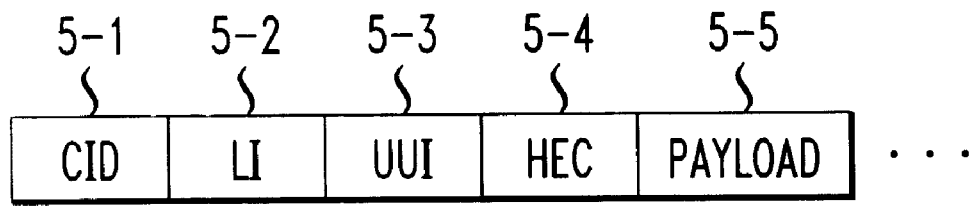
FIG. 4 is an illustrative example of a table used to translate the identity of an incoming trunk to a (a) Channel number assigned to that trunk and (b) Virtual Channel index.
FIG. 5 illustrates the layout of a so-called Common Part Sublayer packet.
Figure 6:
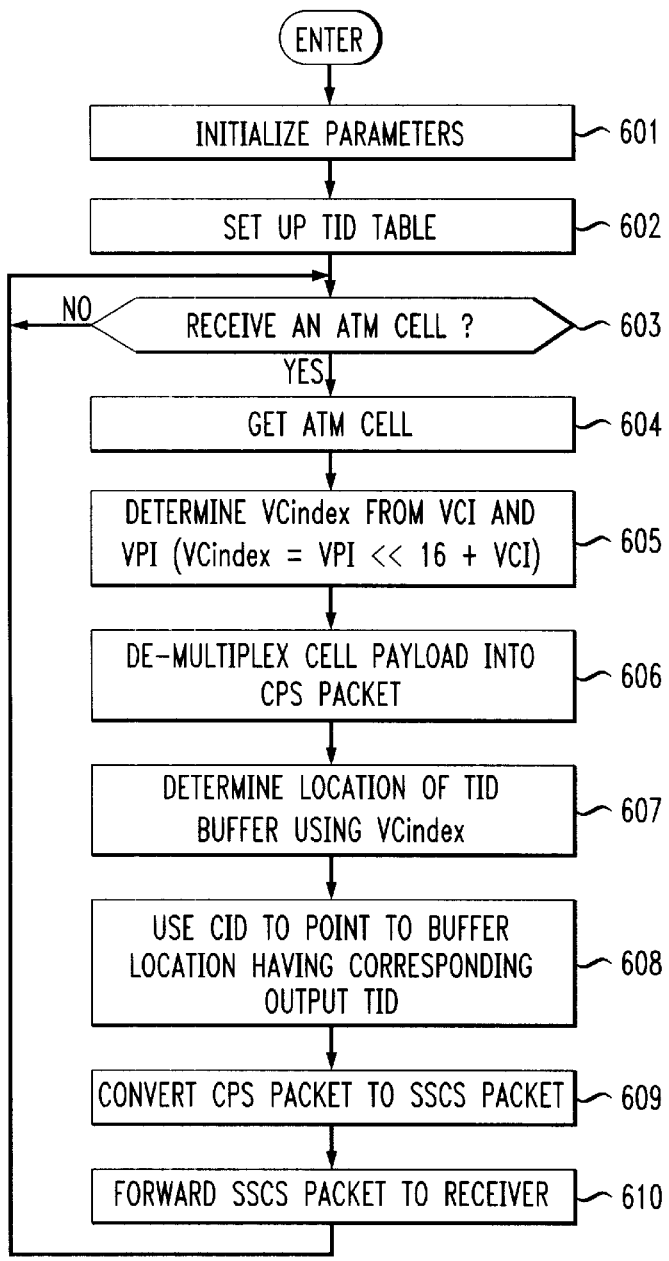
FIG. 6 illustrates in flow chart form the program which implements the principles of the invention in a terminating AAL2 processor.

Specifically, and referring to FIGS. 1 and 3, when initially booted up, AAL2 processor 120 initializes various operating parameters (block 301) and then creates/establishes (block 302), in accordance with an aspect of the invention, a table that translates a particular TID into (a) an AAL2 channel (CID) that had been assigned by configuration manager 125 to that TID and (b) a virtual channel (VC) index derived as a function of the identities of a Virtual Path Identifier (VPI) and Virtual Circuit Identifier (VCI), in which VCindex=VPI<<16+VCI. (Note that VPI and VCI are assigned by configuration manager 125 in the case of permanent virtual connection or as a result of a dynamic routing algorithm running on configuration manager 125 to handle switched virtual circuit service. An illustrative example of the above-mentioned translation table is shown in FIG. 4.

Briefly, as shown, a particular TID points to a location in the translation, in which CID and VC index have been stored, and in which alphabetic notation is used herein to differentiate between the different values of CID and VCindex stored in the table.

Following the foregoing, AAL2 processor 120, FIG. 1, scans the SSCS input buffer in memory 135 to see if the buffer contains a newly received SSCS packet (block 303). When it detects the arrival of such a packet, then AAL2 processor 120 (also referred to herein as just processor 120) unloads the packet (block 304), and then (block 305) uses the TID contained in that packet as an index into the translation table of FIG. 4 to obtain the identity (CID) of the channels assigned to that TID, as explained above. Armed with the CID, processor 120 (block 306) converts the SSCS-PDU into a so-called Common Part Sublayer (CPS)-PDU. The format of a CPS-PDU, as specified by the aforementioned standard, is shown in FIG. 5. Briefly, to form a CPS-PDU, processor 120 inserts in field 5-1 the CID obtained from the translation table for TID in the SSCS-PDU, and insert the contents of the LI, UUI and payloads fields of the SSCS-PDU into fields 5-2, 5-3 and 5-5 of CPS-PDU. Processor 120 also inserts a so-called a Header Error Control (HEC) value, e.g., a checksum based on the values contained in header fields 5-1, 5-2 and 5-3, in field 5-4 to form the CPS-PDU.

Using the TID obtained from the SSCS-PDU at block 304, processor 120 (block 307) indexes a table location containing the associated VCindex, where VCindex=VPI<<16+VCI (as mentioned above), in which the VPI and VCI may be obtained respectively from the two high-order and two low-order bytes of the VCindex. Processor 120 (blocks 308) then segments (multiplexes in accordance with ITU recommendation I.363.2 of the aforementioned standard) the CPS-PDU that it just formed into one or more conventional ATM payloads. As is well known, an ATM payload contains 48 bytes. If one such payload is less than 48 bytes, then processor 120 adds so-called dummy data to the payload to increase it to 48 bytes and stores the payload in an output buffer formed in memory 115. SAR processor 110 then appends a conventional ATM header containing, inter alia, the VPI and VCI obtained at block 307, destination address, etc., to each such payload stored in the output buffer to form a respective ATM cell. SAR processor 110 (block 309) then supplies each such cell, in sequence, to switch fabric 130, which then outputs the cell to an ATM network (represented in FIG. 1 by dashed line 150). The ATM network then transports the cell to a destination ATM switch, e.g., switch 200. SAR processor 210 receives each of the transported cells via switch fabric 230. SAR processor 210 stores the received cells, in sequence, in an input buffer formed in memory 215.

Referring now to FIGS. 1 and 5, similarly, when initially booted up, AAL2 processor 220 initializes various operating parameters (block 601) and then creates/establishes (block 602), in accordance with an aspect of the invention, a table that translates a particular CID/VCindex into a TID that had been assigned by configuration manager 225 to that TID, as will be explained below in detail. An illustrative example of such a translation table is shown in FIG. 7.

Figure 7:
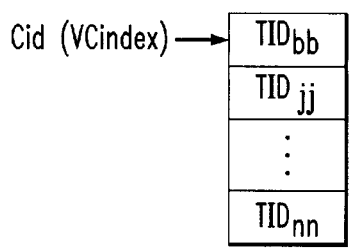
FIG. 7 is an illustrative example of a table used to translate a channel number and VCindex into a trunk number assigned to that channel.

Briefly, as shown in FIG. 7, a particular CID and VCindex both point to a location in the translation table, in which an output TID associated therewith has been stored. (It is noted that alphabetic notation is used in the FIG. to differentiate between the different output TID values stored in the table.

Similarly, at block 603, AAL2 processor 220, FIG. 1, scans the ATM cell input buffer in memory 215 to see if the buffer contains a newly received cell. When it detects the arrival of a cell, then AAL2 processor 220 (also referred to herein as just processor 220) unloads the cell (block 604). Then using the VPI and VCI values contained in the cell header and the expression VC Index=VPI<<16+VCI, processor 220 (block 605) determines the value of the corresponding VC Index. Processor 220 (block 606) then demultiplexes the payload of the received cell into CPS packets. (Processor 220 does this in accordance with ITU-T recommendation I.363.2.) Processor 220 (block 607) then translates the VC Index into a output TID buffer location, and then (block 608) accesses the buffer using the value of the CID contained in the newly formed CPS packet as an index. Processor 220 unloads the corresponding output TID from accessed buffer location, and inserts that output TID in the header (i.e., field 30-1, FIG. 2) of the CPS packet. Processor 220 (block 609) then converts the packet into a SSCS packet and then (block 610) forwards the packet to output module 205 connected to the identified output trunk 76. Output module 205 sends the formed SSCS packet (represented in the FIG. by TSP packet 80) to receiver 75 via the identified output trunk.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of the invention and are within its spirit and scope.

What is claimed is:

1. A method of processing a time-sensitive packet received by an ATM switch from a source of packets comprising the steps of responsive to receiving the time-sensitive packet having a payload and a header, in which the header identifies at least a trunk carrying the packet, indexing a translation table using the trunk identity to obtain an AAL2 channel and a virtual channel index assigned to the trunk identity, converting the received packet to a particular data unit containing at least the assigned AAL2 channel within a respective virtual channel, determining, as a function of the virtual channel index, a virtual path identifier (VPI) and virtual circuit identifier (VCI), processing the particular data to form one or more payloads for respective ATM cells, and forming an ATM cell header containing at least the VPI and VCI and appending the header to each such payload and outputting each cell, in turn, to an output carrying the identified channel.

2. The method of claim 1 further comprising the step of forming the time-sensitive packet as a Service Specific Convergence Sublayer-Protocol Data Unit (SSCS-PDU) for transmission to the ATM switch, in which the SSCS-PDU includes, besides the trunk identity a payload length indicator, a user-to-user indicator and a payload.

3. The method of claim 2 wherein the converting step includes the step of converting the SSCS-PDU into a Common Part Sublayer (CPS)-PDU as the particular data unit, in which CPS-PDU contains at least the identified channel, the SSCS-PDU payload length indicator, user-to-user indicator and payload.

4. A method of processing an ATM cell containing time sensitive data at a destination ATM switch comprising the steps of responsive to receiving the ATM cell containing time sensitive data, converting a virtual path identifier (VPI) and virtual circuit identifier (VCI) contained in the cell into a virtual channel index, converting the cell payload into a particular data unit containing an AAL2 channel identifier, translating the virtual channel index, into a buffer location and indexing the buffer location using the AAL2 channel identifier to obtain a trunk identifier assigned to the channel identifier, inserting the trunk identifier into a header portion of the particular data unit and converting the data unit into a time-sensitive packet, and outputting the time-sensitive to an output connected to the identified trunk.

5. The method of claim 4 wherein the step of converting the cell payload into a Common Part Sublayer-Protocol Data Unit (CPS-PDU) as the particular data unit.

6. The method of claim 5 wherein the step of inserting and converting converts the CPS-PDU to a Service Specific Convergence Sublayer-Protocol Data Unit (SSCS-PDU) as the time-sensitive packet.

* * * * *